United States Patent [19]
Biek

[11] 3,890,051
[45] June 17, 1975

[54] SOCKET RETAINER FOR ROTATABLE POWER TOOL

[75] Inventor: Paul Albert Biek, Houston, Tex.

[73] Assignee: Dresser Industries, Inc., Dallas, Tex.

[22] Filed: Mar. 1, 1974

[21] Appl. No.: 447,129

[52] U.S. Cl. .................. 403/20; 403/361; 403/378
[51] Int. Cl. .............................................. F16b 1/04
[58] Field of Search .......... 403/9, 20, 132, 95, 316, 403/317, 326, 327, 330, 376, 377, 378, 379; 279/1 B, 1 Q, 76, 77

[56] References Cited
UNITED STATES PATENTS

| | | | |
|---|---|---|---|
| 3,011,794 | 12/1961 | Vaughn............................ | 403/361 X |
| 3,285,668 | 11/1966 | Fearon............................. | 403/361 X |
| 3,608,936 | 9/1971 | Karden ................................... | 403/9 |

*Primary Examiner*—Richard J. Scanlan, Jr.
*Assistant Examiner*—Wayne L. Shedd
*Attorney, Agent, or Firm*—Daniel Rubin

[57] ABSTRACT

Improved apparatus for retaining a detachable drive socket on the rotatable drive spindle of power tools such as an impact wrench. The spindle shank includes a longitudinal bore extending inward from its distal end for slideably supporting a plunger formed of a relatively hard, tough elastomer. A compressed coil spring biases the plunger forwardly toward the distal end of the shank while an elongated detent protrudes radially outward of the shank through a lateral bore in the shank side wall from a pivotal attachment in the plunger. With the plunger in its most forwardly biased position, the free end of the detent end protrudes radially outward past the shank periphery a distance sufficient to retain a socket in place on the spindle shank while interferring to prevent coupling or uncoupling therebetween. Displacing the plunger rearward against the spring effects a pivot of the detent for reducing its radial rise to enable coupling or uncoupling of the shank and socket to be effected.

12 Claims, 5 Drawing Figures

3,890,051

SOCKET RETAINER FOR ROTATABLE POWER TOOL

BACKGROUND OF THE INVENTION

1. The field of art to which the invention pertains includes the art of "Tool Driving or Impacting."

2. Rotary driven tools, such as an impact wrench, generally utilize detachable drive sockets to accommodate a full range of hex sizes to be encountered in service. For coupling, uncoupling and retention of the drive sockets to the drive spindle it is customary to employ a retainer mechanism of sorts accommodated within the spindle shank. As is well known, such retainers must be capable of not only performing their intended functions but at the same time should, for practical purposes, also be capable of avoiding undue wear from the severe oscillation and vibration forces imposed from impacting of the wrench. It is not uncommon in such wrenches for the retainer mechanism to incur changes in rotational direction at a frequency of twenty times per second and higher imposing extremely high forces on the retainer components. In a typical retainer construction, as for example disclosed in U.S. Pat. No. 2,954,994 and No. 3,180,435, a detent is radially displaceable for securing a socket to the spindle shank. In at least the latter patent, a plunger of hexagonal section is provided longitudinally positioned in a complementary interfit within the shank bore in order to increase the impacting surface and thereby minimize wear that would otherwise be caused by vibration and oscillation of the tool.

While such retainer mechanisms for power tools as those referred to have been widely commercialized, they are generally characterized by a complexity of construction in order to meet both their functional service requirements for which they are employed and to offset the high wear factors that would otherwise be encountered. A consequence of the construction complexity is the associated high manufacturing cost that such devices incur. Despite existence of this type retainer mechanisms for many years, it has heretofore been unknown how to cost reduce and simplify their construction while retaining the operational features and performance standards presently known.

SUMMARY OF THE INVENTION

This invention relates to rotary power tools and more particularly to improve socket retainers thereof capable of preserving the operational and performance virtues yet substantially reducing the construction complexity and manufacturing costs as compared to similar purpose devices of the prior art. This is achieved in accordance herewith by means of a retainer mechanism comprising only three minimally machined cooperating components contained within the central bore of the spindle shank. A displaceable elastomeric plunger of preselected hardness provides an internal pivotal socket support for one end of an elongated detent which protrudes radially through a lateral bore in the shank to outward thereof past the shank periphery. A spring biases the plunger toward a forward position outwardmost of the shank. In the forward position of the plunger, the detent protrudes sufficiently beyond the shank periphery to retain a coupled socket on the shank while in rearward plunger position the detent retracts reducing its rise and enabling coupling and uncoupling to be effected. With the plunger being of a hard elastomeric composition formed to size by molding or machining, the forces of vibration and oscillation from the impact wrench are readily absorbed. Wear is thereby substantially minimized while eliminating need for interlocks or other special machined constructions to resist these forces in the manner of the prior art. Not only are the number of components reduced thereby, but at the same time the assembly procedure is substantially enhanced by means of a snap-in interfit afforded between detent and plunger socket further contributing to reduction in cost of manufacture. By virtue of such simplicity, both material and labor costs are substantially less as compared to such similar purpose devices of the prior art.

It is therefore an object of the invention to provide a novel combination of rotary power tool and socket retainer therefor.

It is a further object of the invention to provide a novel retainer mechanism for coupling and retaining a socket on the drive spindle of a rotary power tool that is able to readily tolerate the vibration and oscillation forces without the construction complexities associated with similar purpose devices of the prior art.

It is a still further object of the invention to achieve the aforementioned objects without sacrifice in quality or performance but with a reduced fabrication cost compared with similar purpose devices of the prior art.

Figure 1:
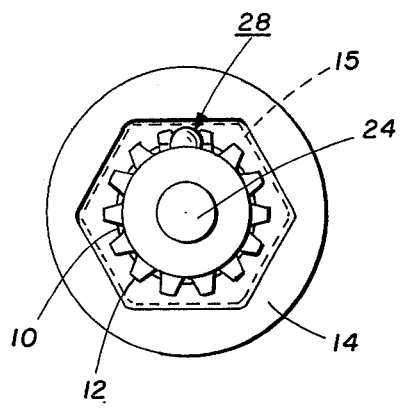
FIG. 1 is an end elevation of a drive socket supported coupled and retained in accordance herewith on the spindle shank of a power tool.

For a detailed understanding of the invention, reference is now made to the drawings illustrating a spindle shank 10 representing the rotatable output drive of an impact wrench or the like. The terminal end of the shank is preferably splined at 12 for a rotatable driving connection with a similarly splined detachable drive socket 14 adapted to drive a hex nut or bolt 15 shown in phantom. To couple and retain drive socket 14 on shank 10, there is provided a retainer mechanism 16 in accordance herewith. Accommodating the retainer mechanism is a blind ended cylindrical bore 18 extending longitudinally central inward of shank 10 from distal end 19 and communicating with a laterally oblique radial-through bore 20 displaced rearward from end 19.

Comprising retainer mechanism 16 is a compressed coil spring 22 positioned behind a slideable elastomeric plunger 24 of cylindrical configuration in turn pivotally supporting the ball end 26 of an elongated detent 28. The detent is of alloy steel or the like and is positioned within bore 20. Longitudinal length of the detent is sufficient for its distal end 30, when the detent is in its most erect orientation, to protrude radially outward beyond the circumference of shank 10 for enabling coupling and retention of socket 14 as will be described.

To receive and support detent 28, plunger 24 includes a radially tapered inward mouth or aperture 32 on its topside communicating with an internal spherical socket 34. Assembly of the detent to the plunger is relatively simple requiring only that plunger 24 be positioned against spring 22 with mouth 32 aligned opposite bore 20. With the plunger in this relation, detent end 26 is inserted radially inward through bore 20 until it resiliently snaps into a swivel grip within plunger socket 34. When attached and supported in this manner, detent 28 acts to prevent inadvertent release of the plunger forwardly outward the open end of bore 18. A small diameter longitudinal bore 36 in plunger 23 communicates with socket 34 to enable an awl or other suitable tool to be inserted for forcing out detent 28 when required.

Figure 2:
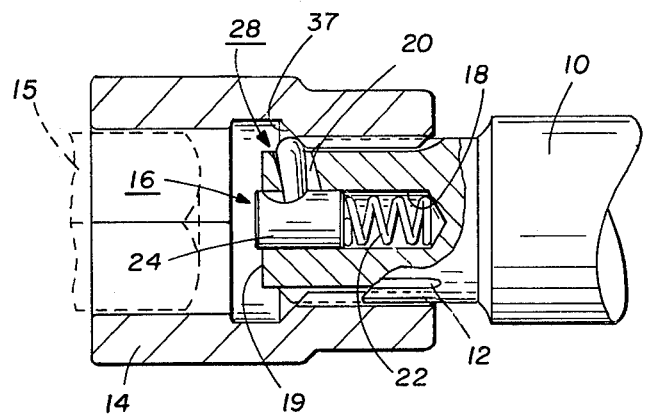
FIG. 2 is a side view partially in section of the coupled-retained relation between drive socket and spindle shank.
Figure 3:
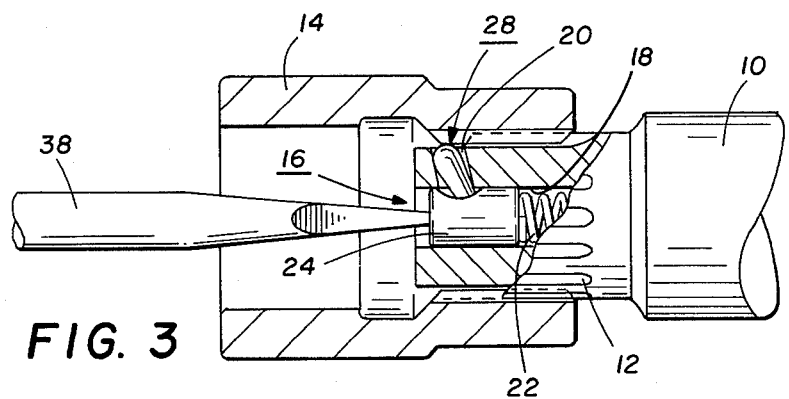
FIG. 3 is a modified view similar to FIG. 2 illustrating the uncoupling relation between drive socket and spindle shank.
Figures 4, 5, 6:
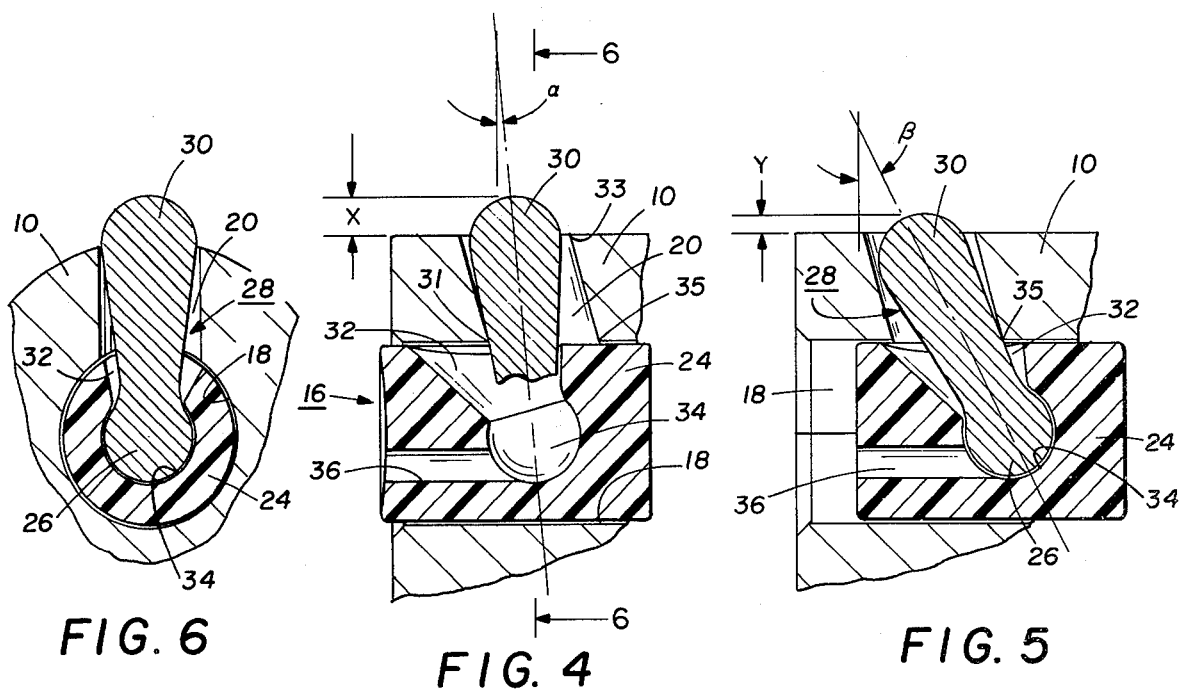
FIG. 4 is an enlarged fragmentary section through the retainer detent and plunger for the coupled relation of FIG. 2.
FIG. 5 is a fragmentary enlarged section through the retainer detent and plunger for the uncoupling relation of FIG. 3.
FIG. 6 is a sectional elevation taken substantially along the lines 6—6 of FIG. 4.

The socket retention relation of detent 28, i.e., having a socket 14 coupled thereon, can best be seen in FIGS. 2 and 4. Required for retention is that radial protrusion of detent end 30 beyond the shank periphery have a radial rise dimension X sufficient to engage annular back chamfer 37 of drive socket 14. With detent end 30 protruding in that manner so as to interfere with any withdrawal movement of the socket, socket 14 cannot be removed. For these purposes dimension X is usually on the order of about ⅛ to ¼ inches. To couple (or uncouple) socket 14, the protruding radial rise of detent end 30 is reduced to a dimension Y of up to about 1/16 inches or at least sufficient to clear the inward diameter of the socket spline. When so positioned, as best seen in FIGS. 3 and 5, the socket can be removed by withdrawal past the detent until clear of shank 10.

Operation of retainer mechanism 16 to effect the socket retainer relation of FIGS. 2 and 4 is effected when plunger 24 is biased by spring 18 to its forwardmost position determined by the limit imposed by detent 28 in bore 20. In this position, forward corner 31 of bore 20 acts in the manner of a fulcrum against the detent shank pivoting it clockwise, as illustrated, into a relatively most erect position within swivel socket 34. To radially withdraw the detent for removing drive socket 14, plunger 24 is forced rearwardly (FIG. 3) by an appropriate tool 38 inserted through socket 14 until the rear face of detent 28 sequentially first engages an opposite top corner 33 and then a lower corner 35 likewise serving as fulcrums for pivoting the detent counterclockwise as illustrated. Forcing the plunger rearward in this manner reduces the radial component dimension of detent 28 until rise dimension X is reduced to dimension Y sufficient for drive socket 14 to clear the detent and be withdrawn. In so doing, bore 20 is of an angle and diameter sufficient to permit the angular offset from positive detent angle $\alpha$ to $\beta$ to enable radial displacement of the detent to be effected. A negative angle in these relations should preferably be avoided.

Essential to absorb and/or dampen the violent impact and vibration forces associated with the high frequency of directional reversals in an impact wrench, is the composition and/or physical properties of plunger 24. For these purposes plunger 24 is preferably of a tough, durable elastomeric composition molded or trimmed to size for a closely slideable fit within shank bore 18. A Shore A durometer hardness of about 60 to about 98 generally represents the hardness range for utilization herein. At the same time, a suitable modulus of elasticity in compression of about 1,000 to 2,000,000 psi is suitable with about 10,000 to 200,000 psi being preferred. These values can, of course, be more or less depending on the severity of service conditions in which the retainer mechanism is to be used. Suitable compositions for these purposes are commercially available materials such as glass fibre reinforced nitride rubber or low density urethane rubber or other materials, natural or synthetic, which are available or can be compounded to provide the necessary elastomeric properties. In more general terms, the plunger should be characterized by high strength and adequate flexibility to receive detent end 26 in a snap-in relation, yet be sufficiently resilient as not to be deleteriously affected from the encountered in-service forces of impact. Exemplifying compositions suitable for these purposes is a 30% glass filled urethane available as IDSA-9250 from Disogrin Industries of Manchester, N.H.

By the above description, there is described a novel socket retainer for a rotary power tool employing a construction which essentially represents the height of simplicity and affording minimum fabrication cost as compared to such similar purpose devices of the prior art. While affording the latter virtues, the device thereof retains the high standard of performance and reliability commerically required in withstanding the magnitude of impact forces encountered in rotary power tools of that type. While the retainer mechanism hereof has been principally described in connection with an impact wrench, it should be apparent that this is not intended as a limitation since it could readily be used and/or adapted for a variety of well known rotary operated power tools.

Since many changes could be made in the above construction and many apparently widely different embodiments of this invention could be made without departing from the scope thereof, it is intended that all matter contained in the drawings and specification shall be interpreted as illustrative and not in a limiting sense.

The embodiment of the invention which an exclusive property or priviledge is claimed are defined as follows:

1. In a rotary operable power tool having an output drive shank adapted to support a detachable drive socket thereon, a retainer mechanism for coupling and retaining a drive socket on said shank, said retainer mechanism comprising in combination:

a. an elastomeric plunger displaceably supported in a longitudinal bore defined within said shank; and b. a pivotally supported elongated detent means extending through a radial bore defined in said shank from a first end communicating inward of said longitudinal bore operably engageable with and retained by said plunger to a second end adapted to protrude radially outward beyond the periphery of said shank;

c. said detent means being operably pivotal by displaceable movement of said plunger and effective when said plunger is at a first location within said longitudinal bore for its said second end to protrude radially outward beyond the periphery of said shank a sufficient distance to retain a coupled socket on said shank and effective when said plunger is at a second location within said longitudinal bore for its said second end to be displaced radially inward from said retaining distance to permit coupling and uncoupling of a drive socket to and from said shank.

2. In a rotary operable power tool according to claim 1 in which said plunger is comprised of a urethane composition.

3. In a rotary operable power tool according to claim 1 including operative means for releasably positioning said plunger at said first location.

4. In a rotary operable power tool according to claim 3 in which said operative means comprises a spring urging said plunger to said first location.

5. In a rotary operable power tool according to claim 3 in which said detent means is more radially erect when said plunger is at said first location than when said plunger is at said second location.

6. In a rotary operable power tool according to claim 5 in which said first detent end is pivotally supported by said plunger.

7. In a rotary operable power tool according to claim 5 in which the surface hardness of said plunger is within the Shore A durometer range of about 60 to about 98.

8. In a rotary operable power tool according to claim 7 in which said plunger supports said detent in a resilient grip therein.

9. In a rotary operable power tool according to claim 8 in which said detent support is defined by a ball-like formation at the first end of said detent and a ball-like socket within said plunger in which to receive said first detent end.

10. In a rotary operable power tool according to claim 6 in which said radial bore is arranged inclined from a radial plane extending therethrough with the outer opening thereof being positioned closer to the distal end of said shank than the inner opening thereof.

11. In a rotary operable power tool according to claim 10 in which said detent is operatively responsive to displacement of said plunger from said first to said second locations to coact with the walls of said radial bore for incurring an increased angular offset from a radial plane extending therethrough.

12. In a rotary operable power tool according to claim 1 in which said detent means is pivottal by displaceable movement of said plunger in a plane longitudinally parallel with the axis of said shank.

* * * * *